(12) United States Patent
Minami et al.

(10) Patent No.: US 6,435,848 B1
(45) Date of Patent: Aug. 20, 2002

(54) VARIABLE CAPACITY TYPE COMPRESSOR WITH CHECK VALVE

(75) Inventors: Kazuhiko Minami; Hiroaki Kayukawa; Kazuya Kimura; Atsuyuki Morishita, all of Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/583,602

(22) Filed: May 31, 2000

(30) Foreign Application Priority Data

Jun. 7, 1999 (JP) ............................................ 11-160067

(51) Int. Cl.⁷ ............................ F04B 23/00; F04B 1/26; F04B 39/10; F16K 21/04; F16K 21/10
(52) U.S. Cl. ................. 417/440; 417/222.1; 417/222.2; 417/269; 417/559; 137/538; 137/514.5; 137/543.19
(58) Field of Search ...................... 417/222.1, 222.2, 417/269, 440, 559; 137/514.5, 538, 543.19; 251/205

(56) References Cited

U.S. PATENT DOCUMENTS

| | | | | |
|---|---|---|---|---|
| 3,092,133 A | * | 6/1963 | Clark | 137/220 |
| 3,425,444 A | * | 2/1969 | Jones | 137/540 |
| 3,765,447 A | * | 10/1973 | Cornell | 137/538 |
| 4,051,864 A | * | 10/1977 | Iwatsuki | 137/504 |
| 4,161,189 A | * | 7/1979 | Mueller, Jr. | 137/514.7 |
| 4,682,531 A | * | 7/1987 | Mayer | 91/446 |
| 4,862,913 A | * | 9/1989 | Wildfang | 137/543 |
| 5,577,894 A | * | 11/1996 | Kawaguchi | 417/222.2 |
| 5,638,860 A | * | 6/1997 | DeRoche | 137/493.8 |
| 5,871,337 A | * | 2/1999 | Fukanuma et al. | 417/222.2 |
| 6,203,284 B1 | * | 3/2001 | Kawaguchi et al. | 417/222.2 |
| 6,354,810 B1 | * | 3/2002 | Minami et al. | 137/469 |

FOREIGN PATENT DOCUMENTS

| | | | |
|---|---|---|---|
| EP | 0 953 765 A2 | 11/1999 | |
| JP | A-60-142082 | 7/1985 | |
| JP | A-10-205446 | 8/1998 | |
| JP | 2000-314377 | * 11/2000 | ........... F04B/27/08 |

* cited by examiner

Primary Examiner—Charles G. Freay
Assistant Examiner—Timothy P. Solak
(74) Attorney, Agent, or Firm—Woodcock Washburn LLP

(57) ABSTRACT

A variable capacity type compressor has a swash plate, pistons reciprocating in the cylinder bores, a suction chamber, and a discharge chamber. A check valve arranged in the compressor. The check valve has a valve seat member having a flow passage and a valve seat, a case attached to the valve seat member, and a valve element arranged in the case for cooperation with the valve seat. The case has a communication hole formed therethrough to allow the gas to flow from the flow passage through the communication hole to the outside circuit. The case has a damper chamber formed therein on the back side of the valve element to damp vibration of the valve element.

21 Claims, 10 Drawing Sheets

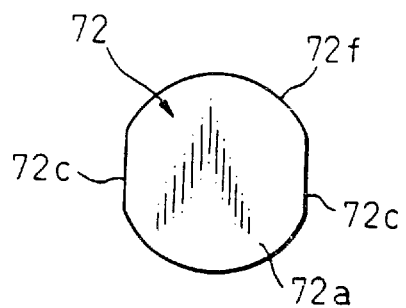
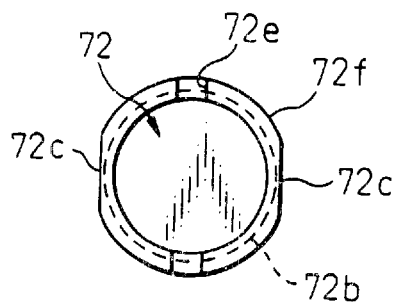
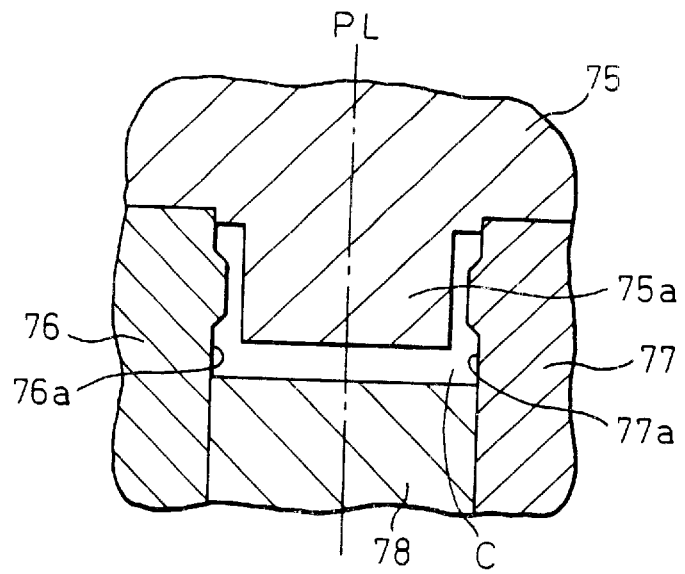
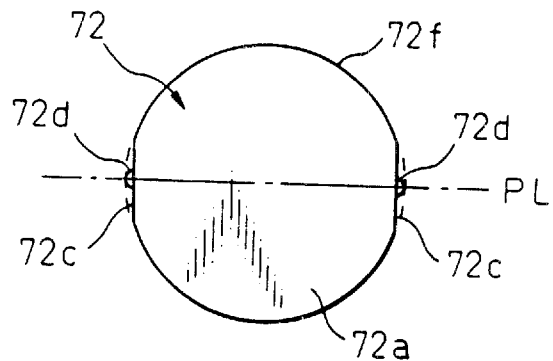

VARIABLE CAPACITY TYPE COMPRESSOR WITH CHECK VALVE

BACKGROUND OF THE INVENTION

1. Field of the Invention

The present invention relates to a check valve. The check valve is suitable for use in a refrigerating circuit having a variable-capacity-type compressor or in the compressor itself. In particular, the check valve is useful to realize a discharge capacity of substantially 0%, in the case where the compressor is operatively coupled to an external drive source in a clutchless manner.

2. Description of the Related Art

A compressor is incorporated in, for example, a refrigerating circuit used for a car air-conditioning system to compress the coolant gas. Such a compressor is usually operatively coupled to a car engine, as an external drive source, via a magnetic clutch by which the compressor is connected to the engine only when a refrigerating load occurs, to effect a compressing operation. However, if the magnetic clutch is provided in the compressor, problems arise in that a total weight increases, a production cost increases, and power is consumed for operating the magnetic clutch. To eliminate such a drawback, there has recently been proposed a so-called clutchless swash plate type variable capacity type compressor which is directly coupled to an external drive source without a magnetic clutch interposed between the engine and the compressor, so that the compressor is normally driven while the external drive source is operating (for example, refer to Japanese Unexamined Patent Publication (Kokai) No. 10-205446).

In the compressor disclosed in the above-described publication,sa swash plate is arranged so that it is tiltable with respect to a drive shaft directly coupled to the external drive source, and a minimum tilting angle of the swash plate is maintained to provide a discharge capacity which is not zero %. Therefore, in this compressor, it is possible to realize reduction of weight as well as to minimize power consumption of the external drive source, by directly coupling the compressor to the drive source without a magnetic clutch.

Also, a check valve is arranged in this compressor, as shown in FIG. 13 of the attached drawings. That is, a hosing 90 has a discharge chamber 91, an accommodation chamber 92 adjacent to the discharge chamber 91 and an outer discharge passage 93 for fluid communication between the accommodation chamber 92 and a condenser (not shown) of a refrigerating circuit, and a check valve 94 together with an O-ring 95 and a circlip 96 is arranged in the accommodation chamber 92 to prevent a coolant gas from reversely flowing into the accommodation chamber 92. More specifically, the check valve 94 comprises a valve seat member 81 a case 82 fitted to the valve seat member 81, a valve element 83 axially slidably arranged in the case 82, and a spring 84 for biasing the valve element 83 toward the valve seat member 81 in the case 82, as shown in FIGS. 14 and 15.

A flow passage 81a is formed through the valve seat member 81 in communication, on one hand, with the discharge chamber 91 and, on the other hand, with the interior of the case 82, and a valve seat 81b is formed in the valve seat member 81 around the outlet of the flow passage.81a. Also, an annular groove 81c is provided in the outer peripheral surface of the valve seat member 81 around the valve seat 81b.

Projections 82a are formed in the inner wall of the open-side end of the case 82 to fit in the annular groove 81c, and communication holes 82b are formed in the outer peripheral wall of the case 82 on the axially opposite side of beyond the valve seat 81b.

The valve element 83 has a seal surface 83a, which is in contact with the valve seat 81b when the valve element 83 slides in one direction toward the valve seat 81b and leaves the valve seat 81b when it slides in the other direction, and an outer peripheral surface 83b perpendicular to the seal surface 83a.

As shown in FIG. 14, in this check valve 94, when the compressor is stopped due to the stopping of the external drive source, a high pressure coolant gas on the side of the condenser and the biasing force of the spring 84 are applied to the valve element 83 to cause the latter to slide in the one direction. Thus, the seal surface 83a is seated on the valve seat 81b of the valve seat member 81 to disconnect the flow passage 81a from the communication holes 82b. Accordingly, the high pressure coolant gas on the side of the condenser is prevented from reversely flowing into the discharge chamber 91.

On the other hand, as shown in FIG. 15, during the operation of the compressor, the high pressure coolant gas in the discharge chamber 91 pushes the valve element 83 through the flow passage 81a, and overcomes the biasing force of the spring 84 to cause the valve element 83 to slide in the other direction. Accordingly, the seal surface 83a leaves the valve seat 81b of the valve seat member 81 to allow the flow passage 81a to be connected to the communication holes 82b. Thus, the high pressure coolant gas in the discharge chamber 91 is delivered to the condenser.

Therefore, in the compressor with such a check valve 94, it is possible to prevent the coolant gas from reversely flowing when the compressor is stopped, so it is possible to prevent the liquid coolant from being held in the compressor and to avoid an excessive temperature or pressure rise in the compressor, as well as to improve durability of the compressor.

Also, in the compressor having a flow passage extending from the discharge chamber 91 to the crank chamber (not shown), it is possible to suppress the pressure rise in the crank chamber when the compressor is stopped, which allows a quick increase in the tilting angle of the swash plate and a quick recovery of the high capacity condition upon starting the operation of the compressor, resulting in a rapid appearance of the refrigerating effect.

However, according to experimental results obtained by the inventors of the present case, it has been found that vibration of the valve element is apt to occur soon after the check valve is opened by the movement of the valve element 83 away from the valve seat 88b and the flow passage 81a starts to communicate with the communication holes 82b, since, in this check valve 94, the outer peripheral surface 83b of the valve element 83 extends just to a position coinciding with the end of the communication hole 82b when the seal surface 83a is seated on the valve seat 81b and the fluid entering the case 82 on the back side of the valve element 83 is allowed to flow out only through the clearance between the case 82 and the valve element 83. In this case, problems such as noise and vibration of the check valve 94 itself occur, and the pressure difference by which the valve element 83 is lifted becomes larger to cause a pressure loss in the check valve 33 itself.

Especially, in the case where the check valve 94 is provided on the side of the condenser in the refrigerating circuit or on the downstream side of the discharge chamber 91 of the compressor, the pressure in the flow passage 81a is high, and the pressure loss adversely affects the refrigerating circuit and a car having such a refrigerating circuit mounted.

It is desirable to equip the above-mentioned check valve 94 in the compressor operatively coupled to the external drive source in a clutchless manner in order to obtain the above-mentioned operation and effect, but such an advantageous operation and effect might be cancelled if there is an inconvenience such as pressure loss in the check valve 94.

SUMMARY OF THE INVENTION

In view of the above-described prior art problems, an object of the present invention is to provide a check valve which can reduce vibration when the valve opens.

Another object of the present invention is to provide a refrigerating circuit and a compressor having such a check valve so that vibration in the compressor and the refrigerating circuit can be reduced, and drawbacks caused thereby are eliminated.

The present invention provides a check valve which comprises a valve housing having a peripheral wall, a flow passage with an inlet opening and an outlet opening formed in the peripheral wall, a valve seat formed in the peripheral wall around the outlet opening, and a communication hole formed through said peripheral wall on the axially opposite side of the valve seat from the flow passage; a valve element having an outer wall axially slidably arranged in the peripheral wall of the valve housing, and a seal surface engagable with the valve seat; and an urging member for biasing the valve element toward the valve seat. The check valve is characterized in that it comprises the valve housing having a damper chamber formed therein for damping vibration of the valve element.

In the check valve according to the present invention, the damper chamber in the valve housing damps vibration of the valve element after the valve is opened when the valve element leaves the valve seat and the flow passage starts to communicate with the communication hole. Therefore, noise and vibration of the check valve itself are prevented, and the pressure difference by which the valve element is lifted will not become higher and a pressure loss in the check valve itself is reduced.

Therefore, in the check valve according to the present invention, vibration hardly occurs after the valve is opened. Also, noise, vibration and a pressure loss of a compressor and a refrigerating circuit are reduced, and the drawbacks caused thereby to a car are eliminated.

Preferably, the outer peripheral surface of the valve element has such a length as to cover the communication hole and extend beyond the communication hole when the seal surface is seated on the valve seat. With this arrangement, it is possible to construct the damper chamber as a space in which the fluid entering the valve housing on the back side of the valve element is enclosed. Also, with this arrangement, the valve element can suitably slide in the valve housing.

However, if such a space is very fluid-tight, the fluid in the space will not easily flow out of the space and it is not possible to obtain a good damping effect for damping the vibration of the valve element. Also, if the fluid in the space flows out of the space only through a clearance between the valve element and the valve housing, the fluid entering the space interferes with the fluid flowing out of the space, so that the fluid in the space cannot so smoothly flow out of the space and the damping effect for damping vibration of the valve element will be low. According to the inventor's experiments, it is possible to obtain a good damping effect if a cross-sectional area of a clearance between the valve element and the valve housing is sufficiently large to allow the fluid flow through the clearance but smaller than 3% of a cross-sectional area in the inner surface of the peripheral wall of the valve housing.

In the case where the valve element is made as a resin molded product, there is a deviation in the clearance between the valve element and the valve housing, so there is a possibility that vibration of the valve element is not stably damped. Therefore, preferably, the valve element is made of resin, and the valve housing has a hole formed through the valve housing on the back side of the valve element. Preferably, the valve housing has a top wall closing one end of the peripheral wall, the hole being provided through the top wall. Preferably, the top wall has a linear groove on the outer surface thereof, the hole being provided through the bottom wall of the linear groove.

With this arrangement, the fluid entering the space will not interfere with the fluid flowing out of the space, and it is possible to obtain a good damping effect for damping vibration of the valve element even if there is a deviation in the clearance between the valve element and the valve housing. Preferably, the sum of a cross-sectional area of the hole and a cross-sectional area of a clearance between the valve element and the valve housing has smaller than 5% of a cross-sectional area in the inner surface of the peripheral wall of the valve housing.

Preferably, the valve housing comprises a first housing member having the flow passage and the valve seat, and a second housing member coaxially coupled to the first housing member and having the communication hole, the first and second housing members together forming the peripheral wall of the valve housing, the valve element and the urging member being arranged in the second housing member. If the valve housing is constituted by separate members in this way, the manufacture of the check valve at a lower cost is facilitated. Preferably, the second housing member is generally cup shaped.

The check valve of the present invention is suitably used in a refrigerating circuit having a condenser and a variable displacement compressor with a discharge chamber communicating with the condenser. Particularly, it is more effective if the communication hole communicates with the condenser.

Preferably, the check valve is incorporated in the variable displacement compressor, rather than being arranged in the piping of the cooling circuit. The coolant gas may expand in the piping on the upstream side of the check valve and reversely flow into the compressor, if the check valve is arranged midway in the piping of the cooling circuit, but there is no such problem if the check valve is incorporated in the compressor.

The check valve according to the present invention is especially effective when it is used with a variable capacity type compressor which is operatively coupled to an external drive source in a clutchless manner. In this case, it is possible to prevent the liquid coolant from being accumulated in the compressor and to avoid an excessive rise in temperature and pressure in the compressor, resulting in the improvement in durability of the compressor. Also, this arrangement functions to quickly increase the tilting angle of a swash plate and to quick recover of the high capacity condition upon starting the operation. Thus, the refrigerating effect is quickly ensured.

Particularly, this arrangement is advantageous in the case where the variable capacity type compressor is of a type capable of realizing a discharge capacity of substantially 0%. In this connection, the compressor of a type capable of realizing a discharge capacity of substantially 0% is, for example, one in that a minimum tilting angle of the swash plate is selected at a value smaller than a critical angle at which the recovery of the tilting angle of the swash plate is ensured by the reaction of the discharge pressure, as disclosed in EP 0 953 765 A2.

BRIEF DESCRIPTION OF THE DRAWINGS

The present invention will become more apparent from the following description of the preferred embodiments, with reference to the accompanying drawings, in which:

FIG. 6A is a bottom view of the valve element of the check valve;

FIG. 6B is a top view of the valve element of the check valve;

FIG. 7 is a sectional view of a mold for producing the valve element of the check valve;

FIG. 8 is an enlarged bottom view of the valve element of the check valve;

DESCRIPTION OF THE PREFERRED EMBODIMENTS

The present invention will now be described with reference to the preferred embodiment shown in the attached drawings wherein a check valve of the present invention is incorporated in a variable capacity swash plate type compressor used for a car air conditioning system.

Figure 1:
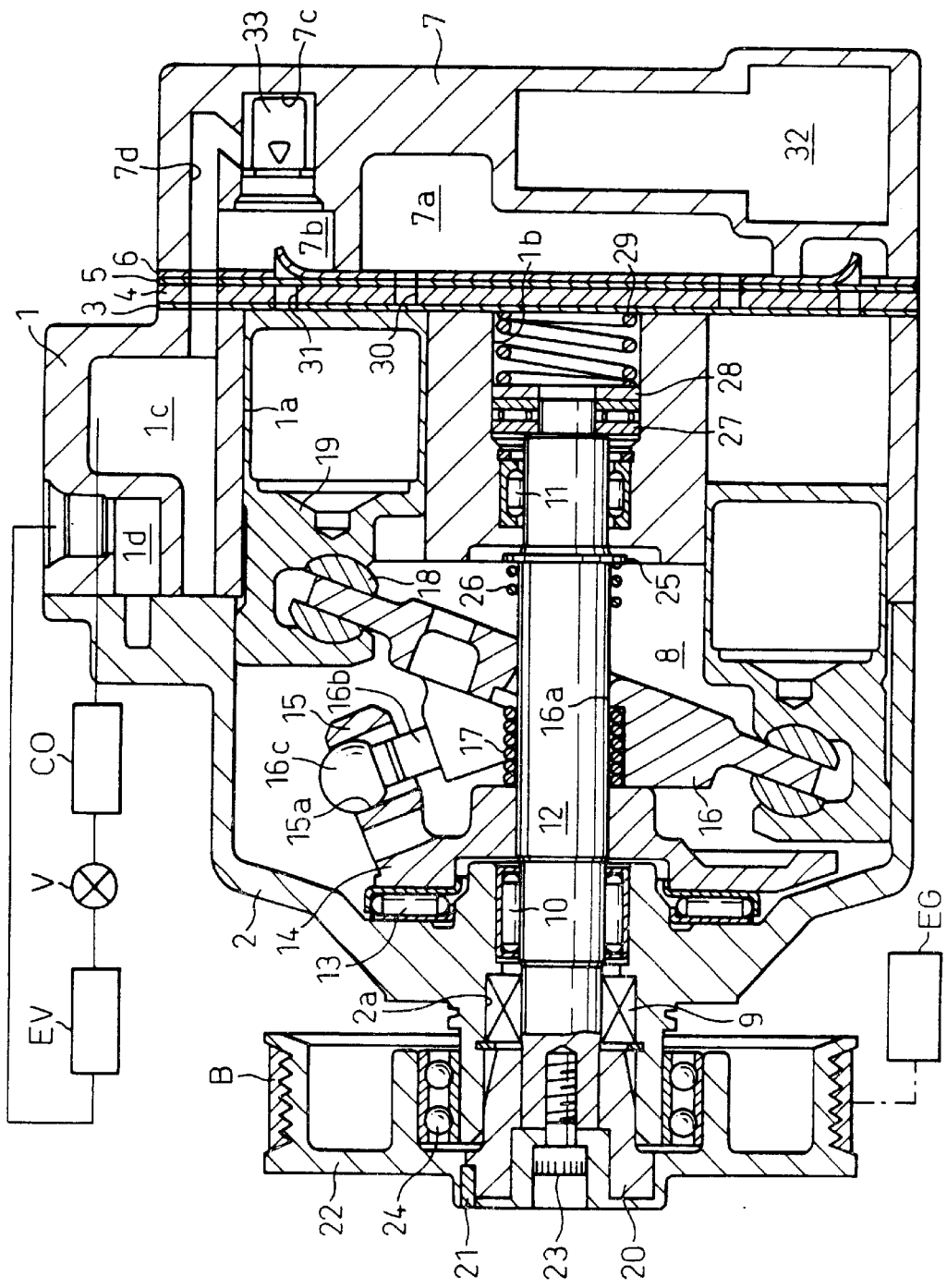
FIG. 1 is a longitudinal sectional view of a variable capacity type compressor of a swash plate type according to one embodiment of the present invention.

As shown in FIG. 1, the compressor has a housing comprising a cylinder block 1, a cup-shaped front housing 2 attached to the front end of the cylinder block 1, and a rear housing 7 attached to the rear end of the cylinder block 1 via valve assembly comprising a suction valve plate 3, a central valve plate 4, a discharge valve plate 5 and a retainer plate. The cylinder block 1, the front housing 2 and the rear housing 7 are made of aluminum type metal.

The cylinder block 1 has a plurality of cylinder bores 1a, an axial bore 1b, a muffler chamber 1c and a pre-suction chamber 1d. The front housing 2 has an axial bore 2a. The rear housing 7 .has a suction chamber 7a, a discharge chamber 7b, an accommodating chamber 7c, and a discharge passage 7d. The suction valve plate 3 has suction valve elements, the central valve plate 4. has valve holes, the discharge valve plate 5 has discharge valve elements, and the retainer plate has retainer elements, in accordance with the cylinder bores 1a.

A drive shaft 12 is rotatably arranged in a crank chamber 8, which is formed in the front end portion of the cylinder block 1 and the front housing 2, and supported by a shaft seal device 9 and a radial bearing 10 in the axial bore 2a and a radial bearing 11 in the axial bore 1b.

A swash plate 16 is arranged in the crank chamber 8 and mounted to the drive shaft 12. The drive shaft 12 extends through a through-hole 16a of the swash plate 16. A lug plate 14 is fixed to the drive shaft 12 in the crank chamber 8, and a thrust bearing 13 is interposed between the lug plate 14 and the front housing 2. A pair of arms 15 project rearward from the lug plate 14, each of the arms 15 having a guide bore 15a having a cylindrical inner wall. A pair of guide pins 16b extend from the front end of the swash plate 16 toward the pair of arms 15, respectively. Each guide pin 16b has a guide portion 16c having a spherical outer surface at the tip end thereof, which is rotatably and slidably engaged in the guide bore 15a.

A spring 17 is disposed around the drive shaft 12 between the swash plate 16 and the lug plate. 14 to urge the swash plate 16 toward the rear housing 7. A plurality of hollow pistons 19 are reciprocatingly arranged in the cylinder bores 1a and engaged with the peripheral portion of the swash plate 16 by pairs of shoes 18 on the front and rear surfaces of the swash plate 16, respectively.

A boss 20 is fitted on a portion of the drive shaft 12 extending forward from the front housing 2 by spline engagement, and a pulley 22 is fixed to the boss 20 by a key 21. The pulley 22 is fixed to the drive shaft 12 with a bolt 23 and is rotatably supported by the front housing 2 with a ball bearing 24. A belt B is wound on the pulley 22, and coupled to an engine EG of a car.

A spring 26 is arranged around the drive shaft 12 at a position slightly behind the swash plate 16 and secured by a circlip 25, to receive the swash plate 16 when the swash plate 16 moves to the right in FIG. 1. A thrust bearing 27 and a washer 28 are provided in the axial bore 1b of the cylinder block 1, and a spring 29 is disposed between the washer 28 and the suction valve plate 3. The thrust bearing 27 receives the end of the drive shaft 12.

Therefore, the swash plate 16 is rotatable with the drive shaft 12 to carry out the known compression operation, and tiltable with respect to the drive shaft 12 to change the capacity of the compressor. The swash plate 16 can be titled between a maximum tilting angle in which discharge capacity of the compressor is the largest and a minimum tilting angle in which discharge capacity of the compressor is the smallest. The minimum tilting angle of the swash plate 16 is determined at a valve smaller tha[008e] a critical angle at which the recovery of the tilting angle of the swash plate 16 is ensured by the reaction of the discharge pressure, and the recovery of the swash plate 16 from the minimum tilting angle toward the maximum tilting angle is ensured by the cooperation of the amount acting on the swash plate 16 in the direction to increase the tilting angle due to the rotation of the swash plate 16 and the moment based on the bias of the spring 26.

The suction chamber 7a in the rear housing 7 is connected to the pre-suction chamber 1d via a suction passage (not shown), the suction chamber 7a being connected to the cylinder bores 1a via suction ports 30 provided through the retainer plate 6, the discharge valve plate 5 and the central valve plate 4, and the suction valve elements. The pre-suction chamber 1d is connected to an evaporator EV in the refrigerating circuit by piping, and the evaporator EV is connected to a condenser CO via an expansion valve V by piping.. The discharge chamber 7b is formed in the rear housing 7 around the suction chamber 7a. The accommodation chamber 7c is formed behind the discharge chamber 7b, and communicates with the muffler chamber 1c of the cylinder block 1 via the discharge passage 7d formed through the retainer plate 6, the discharge valve plate 5, the central valve plate 4 and the suction valve plate 3. The muffler chamber 1c is connected to the condenser CO of the refrigerating circuit by piping. The discharge chamber 7b communicates with the respective cylinder bores 1a via discharge ports 31, respectively, provided through the central valve plate 4 and the suction valve plate 3.

A control valve 32 is arranged in the rear housing 7, and a check valve 33 is accommodated in the accommodation chamber 7c behind the discharge chamber 7b.

Figure 2:
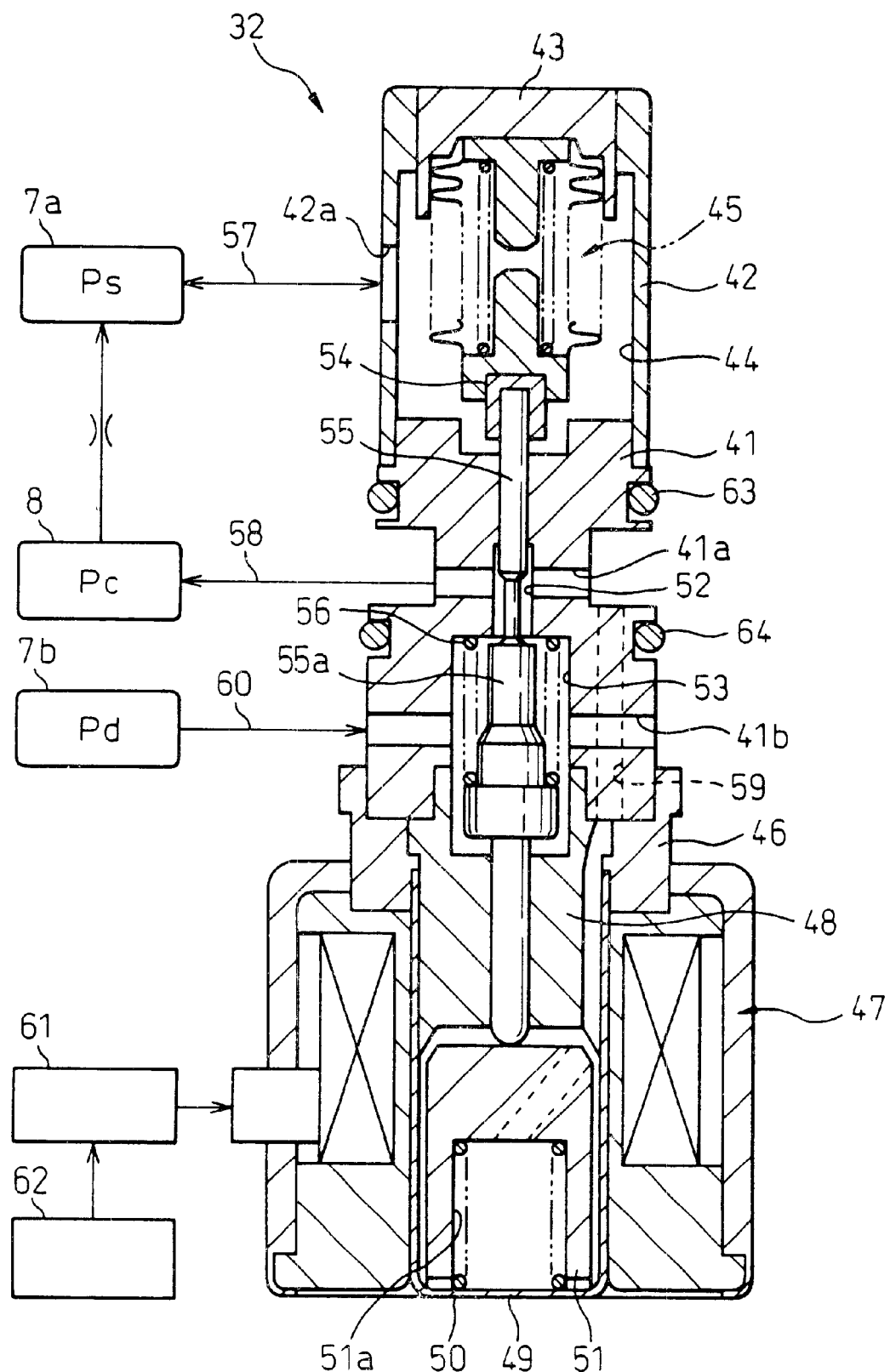
FIG. 2 is a longitudinal sectional view of the. control valve of the variable capacity swash plate type compressor of FIG. 1.

As shown in FIG. 2, the control valve 32 has a valve housing 41, a cover 42 is attached to one end of the valve housing 41, and one end of the cover 42 is blocked by a lid member 43. A pressure sensitive chamber 44 is formed in a space defined by the valve housing 41, the cover 42 and the lid member 43, and a bellows 45 is accommodated in the pressure sensitive chamber 44 in the axially extendable and contractible manner.

A solenoid 47 is fixed to the other end of the valve housing 41 via a fixture member 46. A stationary iron core 48 is fixed to the other end of the valve housing 41 in the solenoid 47, and a movable iron core 51 is slidably accommodated in an accommodation tube 49 fixed to the inner wall of the solenoid 47 at the other end of the stationary iron core 48. The movable iron core 51 has a spring chamber 51a at the other end, in which a spring 50 is disposed for biasing the movable iron core 51 toward the one end.

An axial bore 52 is provided axially through the valve housing 41 and the stationary iron core 48. The axial bore 52 communicates with a valve chamber 53 at a position between the other end of the valve housing 41 and the stationary iron core 48. A rod 55, fixed to the other end of the bellows 45 by a fixture member 54 in the pressure sensitive chamber 44, is slidable in the axial bore 52, and a valve element 55a located within the valve chamber 53 is fixed to an intermediate portion of the rod 55. A spring 56 is provided between the valve element 55a and one end of the valve chamber 53. The other end of the rod 55 abuts against one end of the movable iron core 51.

An opening 42a is provided in the cover 42, through which the pressure sensitive chamber 44 communicates with the suction chamber 7a of the rear housing 7 via a pressure detection passage 57. Further in the valve housing 41, a port 41a communicating with the axial bore 52 directing from the valve chamber 53 to the bellows 45 and a port 41b communicating with the valve chamber 53 are formed. The axial bore 52 directing from the valve chamber 53 to the bellows 45 is communicated with the crank chamber 8 by an air-intake passage 58 via the port 41a. Also, the valve housing 41, the stationary iron core 48 and the movable iron core 51 has a cancellation passage 59 for communicating the air-intake passage 58 with the spring chamber 51a in the movable iron core 51. On the other hand, the valve chamber 53 and the discharge chamber 7b of the rear housing 7 are communicated with each other by an air-intake passage 60 via the port 41b. A coil of the solenoid 47 is connected to a control computer 62 via a drive circuit 61. In this regard, reference numerals 63 and 64 denote O-rings for accommodating the control valve 31 within the rear housing 7 in an air-tight manner.

Figure 3:
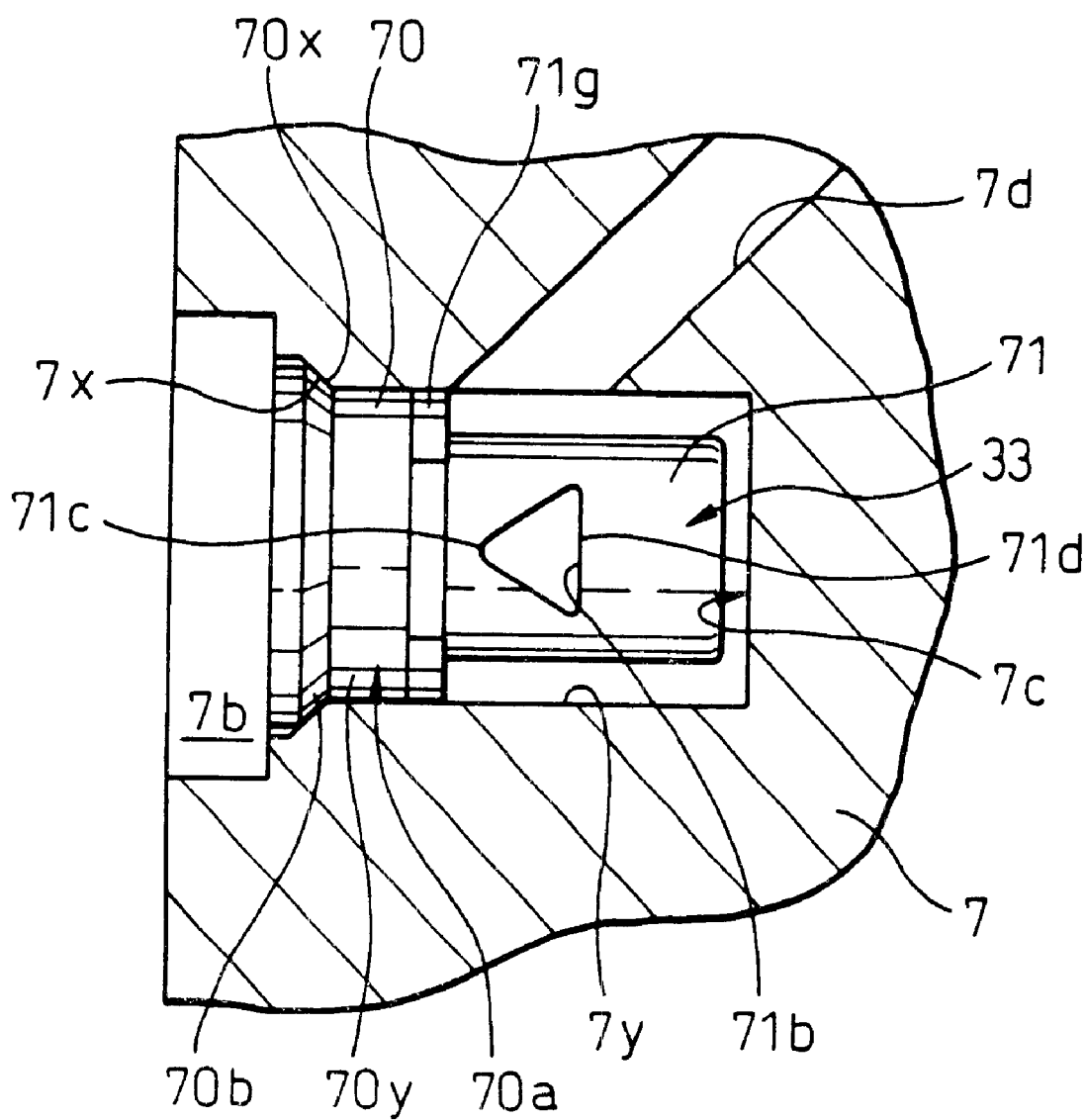
FIG. 3 is a front view of the check valve of the variable capacity swash plate type compressor of FIG. 1.
Figure 4:
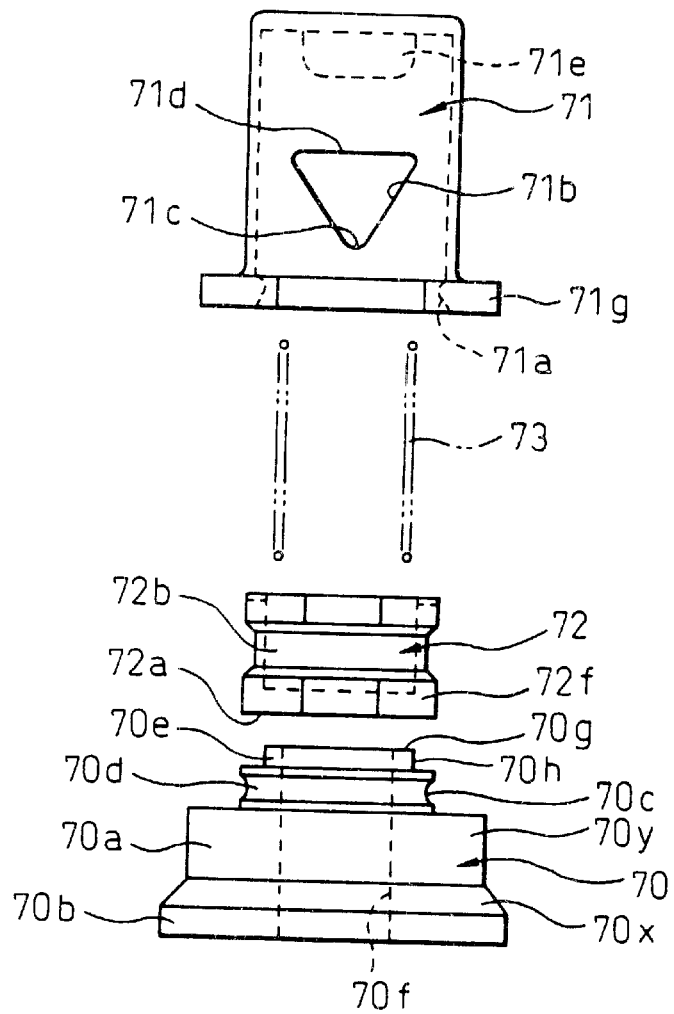
FIG. 4 is an exploded front view of the check valve of FIG. 3.

As shown in FIGS. 3 and 4, the check valve 33 is press-fitted into the accommodation chamber 7c arranged adjacent to the discharge chamber 7b. As shown in FIG. 3, the accommodation chamber 7c has a tapered surface 7x and a simple cylindrical surface 7y, the diameter of the tapered surface 7x becoming smaller inward and the inner end of the tapered surface 7x merging with the simple cylindrical surface 7y.

The check valve 33 has a valve housing comprising a valve seat member 70 and a case 71 fitted on the valve seat member 70 and forming a gap between the case 71 and the bottom of the accommodation chamber 7c. The check valve 33 also has a valve element 72 axially slidably arranged in the case 71, and a spring 73 for biasing the valve element 72 in the case 71 toward the valve seat member 70. The valve seat member 70 is made of brass, the case 71 and the valve element 72 are made of injection-molded resin products, and the spring 73 is made of spring steel. Since the valve seat member 70 and the case 71 are separately produced from each other, it is possible to easily produce the check valve 33 at a lower production cost.

As shown in FIG. 4, the valve seat member 70 includes a main body portion 70a having an axially extending cylindrical surface 70y having a diameter adapted for interference fit in the cylindrical surface 7y of the accommodation chamber 7c, a positioning portion 70b integrally formed with the main body portion 70a on one side thereof, a small diameter portion 70d integrally formed with the main body portion 70a on the other side thereof, and a valve seat portion 70e integrally formed. with the small diameter portion 70d at the other end of the small diameter portion 70d.

The valve seat member 70 has a flow passage 70f formed therethrough, the flow passage 70f having an inlet opening for communication with the discharge chamber 7b and an outlet opening directed to the valve element 72 for communication with the interior of the case 71. The positioning portion 70b has a tapered surface 70x formed in the shape complementary with the shape of the tapered surface 7x of the accommodation chamber 7c. The tapered surface 70x is contiguous to and diverges from the main body portion 70a. The small diameter portion 70d has a diameter smaller than that of the main body portion 70a, and the valve seat portion 70e has a diameter smaller than that of the small diameter portion 70d.

The small diameter portion 70d has an annular groove 70c on the outer circumference thereof as an engagement means. A valve seat 70g is formed in the valve seat portion 70e around the outlet opening of the flow passage 70f. A recess 70h exists around the valve seat 70g, by designing the diameter of the valve seat portion 70e smaller than that of the small diameter portion 70d, whereby an outer peripheral portion of a seal surface 72a of the valve element 72 is not in contact with the valve seat 70g at the recess 70h.

Figure 5:
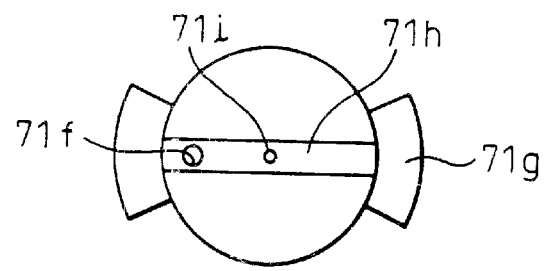
FIG. 5 is a plan view of the case of the check valve of FIGS. 3 and 4.

The case 71 has a cup-shaped form with an open end, and the outlet opening of the flow passage 70f is opened to the interior of the case 71. The inner surface of the outer peripheral wall of the case 71 at the open end thereof has a pair of projections 71a arranged symmetrically with respect to the axis of the case 71, the projections 71a being fitted into the groove 70c of the small diameter portion 70d from outside. The projections 71a constitute engagement means. A pair of flanges 71g in the shape of a sector extend outward from the outer peripheral wall of the case 71 only at positions corresponding to the projections 71a, as also shown in FIG. 5. The outer peripheral surface of the flanges 71g are flush with the outer peripheral surface of the body portion 70a of the valve seat member 70, and the flanges 71g contact the inner surface of the accommodation chamber 7c when the check valve 33 is arranged in the accommodation chamber 7c. The flanges 71g constitute a securing means and a widening-inhibiting means. The flanges 71g and the projections 71a are located at the same axial position on the case 71.

Communication openings 71b are formed through the outer peripheral wall of the case 71 on the axially opposite side of the valve seat 70g from the flow passage 70f. The communication hole 71b has linear sides which are not parallel to the axis of the case 71, but it is of an equilateral triangular shape which is symmetrical with respect to the axis of the case 71, with the triangle having an apex 71c at an axial position corresponding to the valve seat 70g and a bottom side 71d opposite thereto. Such a communication hole 71b can be easily designed and is practical.

In this way, the communication hole 71b is shaped such that an opening area of the communication hole 71b with respect to a lift of the valve element 72 from the valve seat 70g is smaller than that of a communication hole in the case where an opening area is proportional to the lift of the valve element. In addition, a boss 71e extends inward from the inner end surface of the case 71, and a groove 71h is diametrically provided in the outer end surface of the case 71, as shown in FIG. 5. The reference numerals 71i denotes a trace of a gate used during injection molding.

Figure 10:
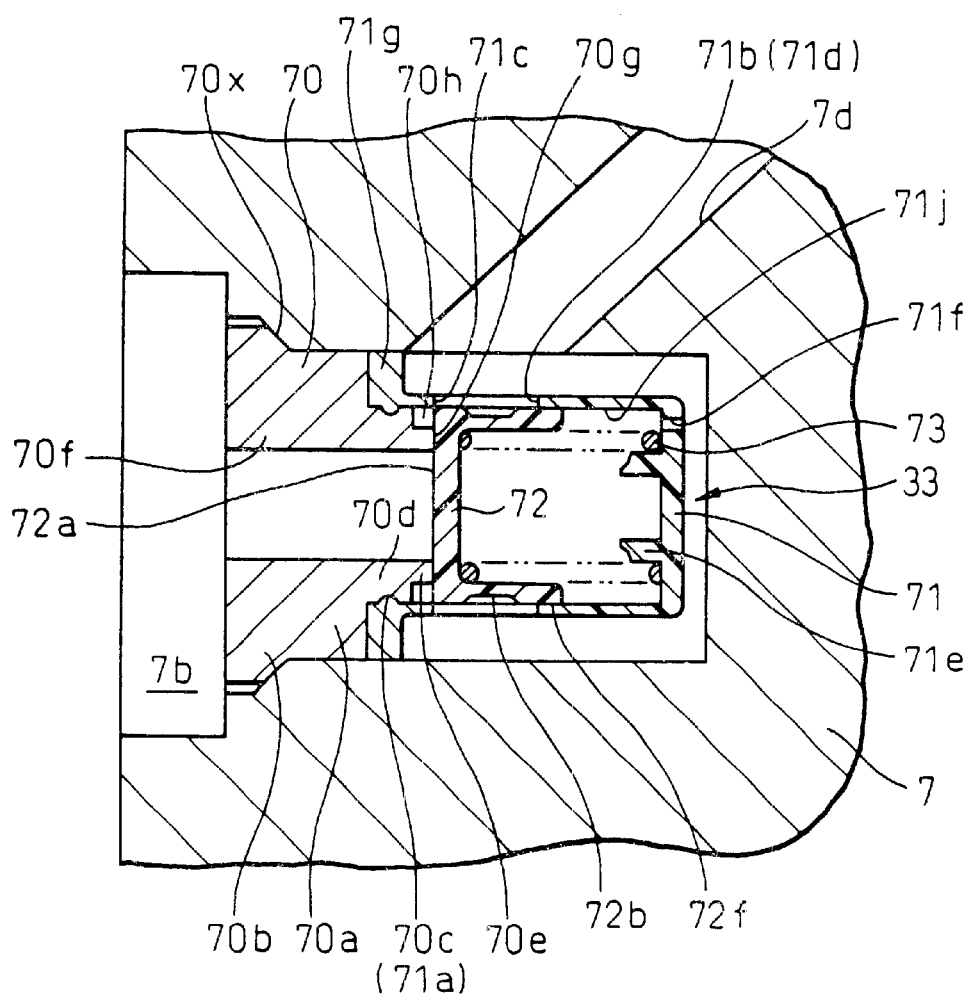
FIG. 10 is an enlarged longitudinal sectional view of the check valve when the valve is closed.
Figure 11:
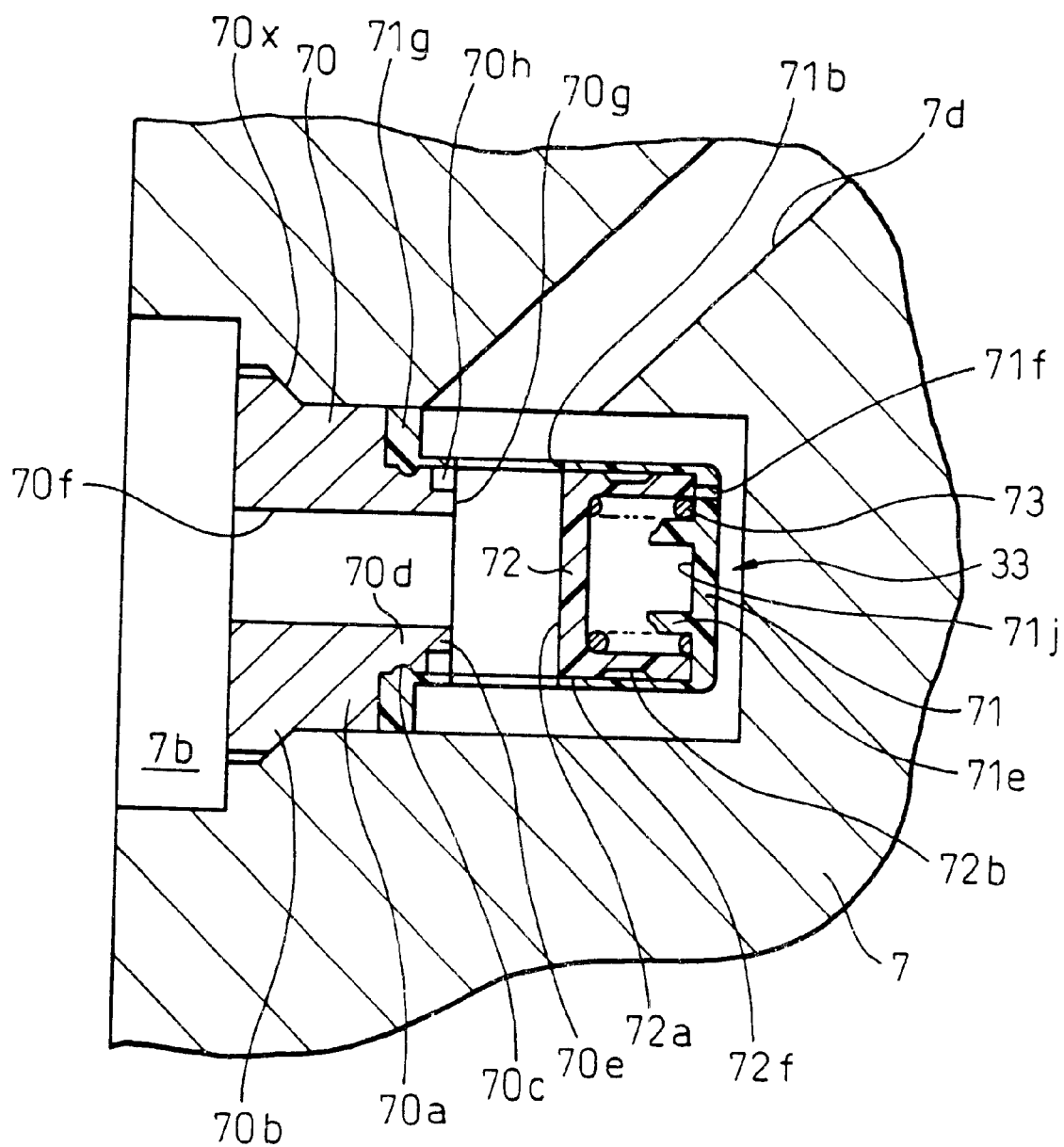
FIG. 11 is an enlarged longitudinal sectional view of the check valve when the valve is opened.

The valve element 72 is generally cup shaped, as shown in FIGS. 4, 10 and 11. As shown in FIGS. 4, 6A and 6B, the valve element 72 has a bottom surface defining the seal surface 72a which can be brought into abutment against the valve seat 70g when the valve element 72 slides in one direction and away from the valve seat 70g when it slides in the other direction. As shown in FIG. 10, the apex 71c of the communication hole 71b of the case 71 coincides with the seal surface 72a when the seal surface 72a of the valve element 72 is seated on the valve seat 70g of the valve seat member 70. On the other hand, the bottom side 71d of the communication hole 71b of the case 71 is located closer to the valve seat member 70 than the upper surface of the peripheral wall extending perpendicular to the seal surface 72a of the valve element 72 when the seal surface 72a of the valve element 72 is seated on the valve seat 70g of the valve seat member 70. In other words, the outer peripheral surface 72f of the valve element 72 extends beyond the communication hole 71b when the seal surface 72a is seated. A gap between the inner peripheral surface of the case 71 and the outer peripheral surface 72f of the valve element 72 is in the range from several tens to two hundred μm.

As shown in FIG. 5, a hole 71f is formed in the groove 71h through the top wall of the case 71 at a position avoiding the boss 71e. Thus, as shown in FIG. 10, a damper chamber 71j is formed in the interior of the case 71 behind the valve element 72. The spring 73 is retained between the inner surface of the peripheral wall of the valve element 72 and the outer surface of the boss 71e so as not to vibrate. As shown in FIG. 4, in the axially middle region of the outer peripheral surface 72f of the peripheral wall of the valve element.72, there is an annular groove 72b capable of communicating with the communication hole 71b when the valve element 72 is away from the valve seat 70g. This groove 72b constitutes a guide means or a guide passage which can be easily formed.

The valve element 72 can be produced as follows. As shown in FIG. 7, a mold assembly, which includes a first mold member 75 having a core section 75a, first and second split mold members 76 and 77 arranged around the core section 75a and splitablly coupled to each other at axially extending parting surfaces PL, and a second mold member 78 located opposite to the top surface of the core section 75a is first prepared. The first and second split mold members 76, 77 have flat surfaces 76a and 77a extending axially and perpendicular to the parting surfaces PL, facing the cavity C formed in the mold assembly. The second mold member 78 is arranged in the first and second split mold members 76, 77 when the mold assembly is closed and can be axially moved to open the mold away from the core section 75a. Molten resin is injected into the cavity C, and the valve element 72 can be obtained by opening the mold. The valve element 72 thus obtained is assembled with the separately prepared members such as the valve seat member 70, the case 71 and the spring 73 to provide the check valve 33.

Figure 9:
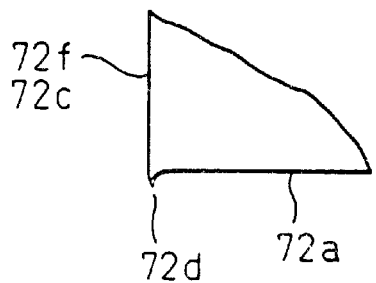
FIG. 9 is an enlarged side view of a portion of the valve element of the check valve.

As shown in FIGS. 6A and 6B, the valve element 72 has a pair of axially extending flat surfaces 72c formed in the outer peripheral surface 72f of the valve element 72 opposite to each other. The flat surfaces 72c facilitate the grip of the valve element 72 and prevent the erroneous assembly thereof. As shown in FIG. 8, the flat surfaces 72c can also serve so that a molding burr 72d, which may radially outwardly project from and remain on the peripheral wall of the valve element 72 at the parting surfaces PL of the mold assembly during the manufacture of the valve element 72, will be surely accommodated within an imaginary circle of the valve element 72, as shown in FIG. 8, to avoid an adverse effect caused by sticking of the burrs 72d in the inner surface of the case 71. Also, a molding burr 72d, which axially projects from and remain on the periphery of the seal surface 72a during the manufacture of the valve element 72, as shown in FIG. 9, will be surely accommodated within the recess 70h of the valve seat member 70, as shown in FIG. 10, to avoid an adverse effect caused by sticking of the burrs 72d in the valve seat 70g. The recess 70h of the valve seat member 70 also facilitates the valve element 72 leaving from the valve seat 70g, since the contact area of the seal surface 72a of the valve element 72 with the valve seat 70g becomes smaller.

Further, as shown in FIG. 6B, the valve element 72 has radially extending grooves 72e formed in the top surface of the peripheral wall thereof. If the valve element 72 is reversely assembled, the function of the check valve 33 is not achieved due to the groove 72e, whereby an erroneous assembly will be easily found in the inspection process.

In the thus constructed compressor, as shown in FIG. 1, the pulley 22 is rotated by the engine EG via the belt B while the engine EG is operating, and the drive shaft 12 is driven. Thus, the swash plate 16 is subjected to a wobbling motion to cause the pistons 19 to reciprocate in the cylinder bores 1a. Therefore, the coolant gas in the evaporator EV in the refrigerating circuit is sucked into the suction chamber 7a of the compressor and then into the cylinder bore 1a, compressed in cylinder bore 1a, and discharged into the discharge chamber 7b. The coolant gas in the discharge chamber 7b is discharged into the condenser CO via the check valve 33 and the muffler chamber 1c.

While the compressor is operated in this way, the control valve 32 shown in FIG. 2 supplies the coolant gas in the discharge chamber 7b under the discharge pressure Pd through the air-intake passage 60, the port 41b, the axial bore 52, the port 41a and the air-intake passage 58, so as to balance the predetermined pressure of the bellows 45 in the pressure-sensitive chamber 44 with the suction pressure Ps guided from the suction chamber 7a through the pressure-detection passage 57, under the regulation by the control computer. Accordingly, the pressure Pc in the crank chamber 8 is increased or decreased, to change the back pressure applied to the piston 19 to change the tilting angle of the swash plate 16, whereby the discharge capacity of the compressor is varied from substantially 0% to 100%.

In the check valve 33, as shown in FIG. 11, the high pressure coolant gas in the discharge chamber 7b flowing through the flow passage 70f acts on. the valve element 72 and pushes the valve element 72 against the bias of the spring 73 to slide in the other direction. The seal surface 72a thus leaves the valve seat 70g of the valve seat member 70 to allow the communication between the flow passage 70f and the communication hole 71b. Thus, the high pressure coolant gas in the discharge chamber 7b is discharged to the condenser CO via the muffler chamber 1c.

After the check valve 33 is opened when the valve element 72 leaves the valve seat 70g and the flow passage 70f starts to communicate with the communication hole 71b, the coolant gas in the case 71 on the back side of the valve element 72 flows out of the case 71 through the hole 71f and does not interfere with the coolant gas entering the case 71. Therefore, the damper chamber 71j in the case 71 acts to damp vibration of the valve element 72. As a result, noise and vibration of the check valve 33 itself are prevented, and the pressure difference by which the valve element 72 is lifted will not become higher and a pressure loss in the check valve 33 itself is reduced.

Figure 12:
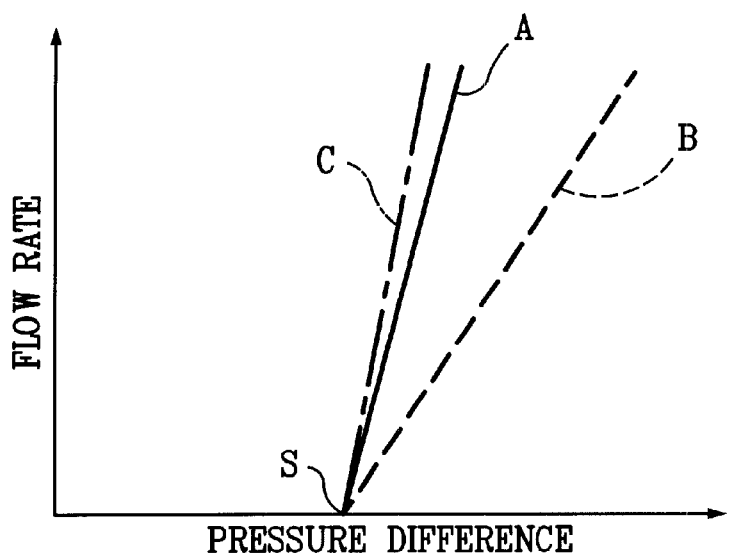
FIG. 12 is a graph, obtained by experiment, showing the relationship of the flow rate and the pressure difference.
Figure 13:
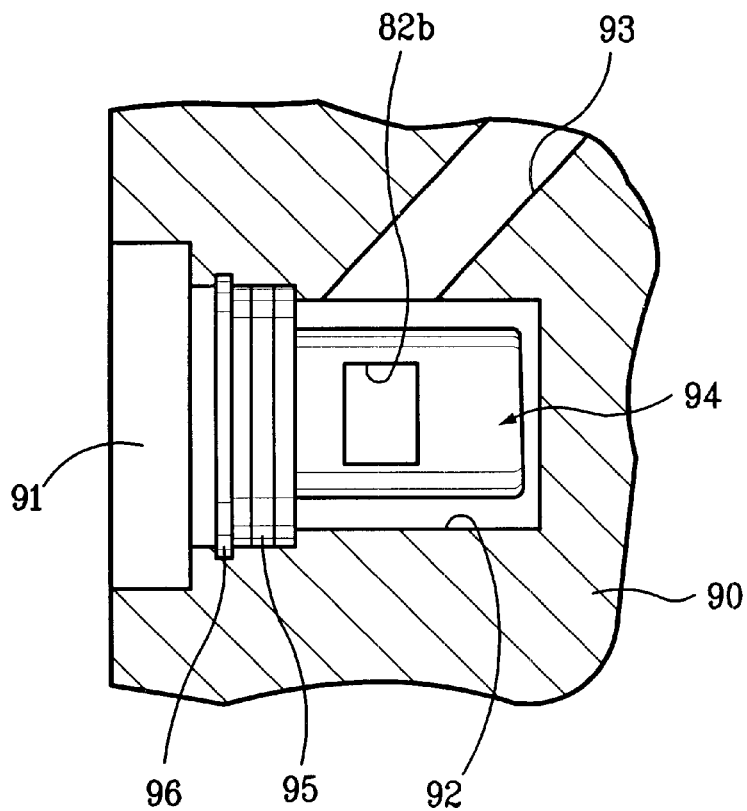
FIG. 13 is a front view of a prior art check valve.
Figure 14:
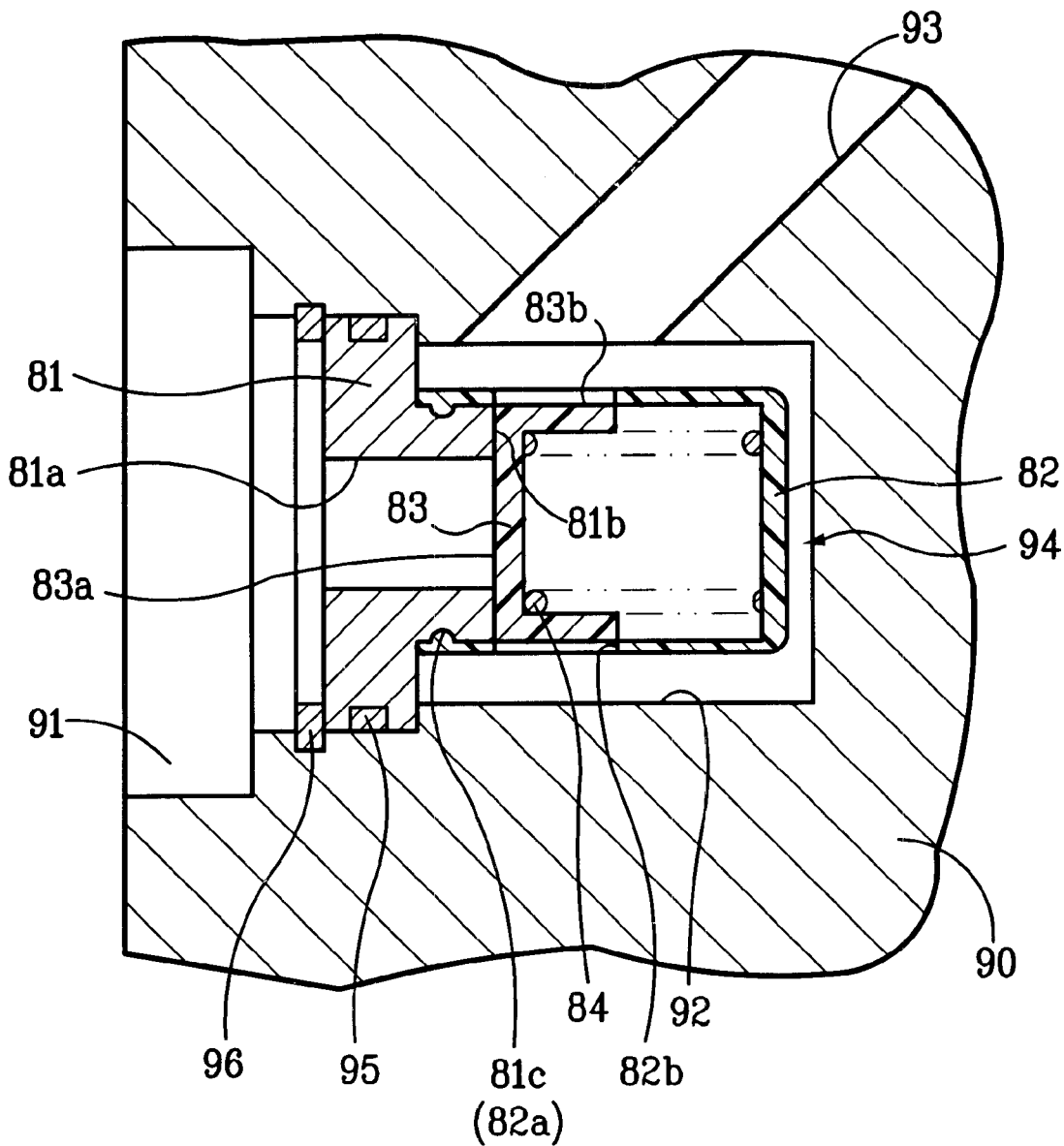
FIG. 14 is an enlarged longitudinal sectional view of the prior art check valve when the valve is closed.
Figure 15:
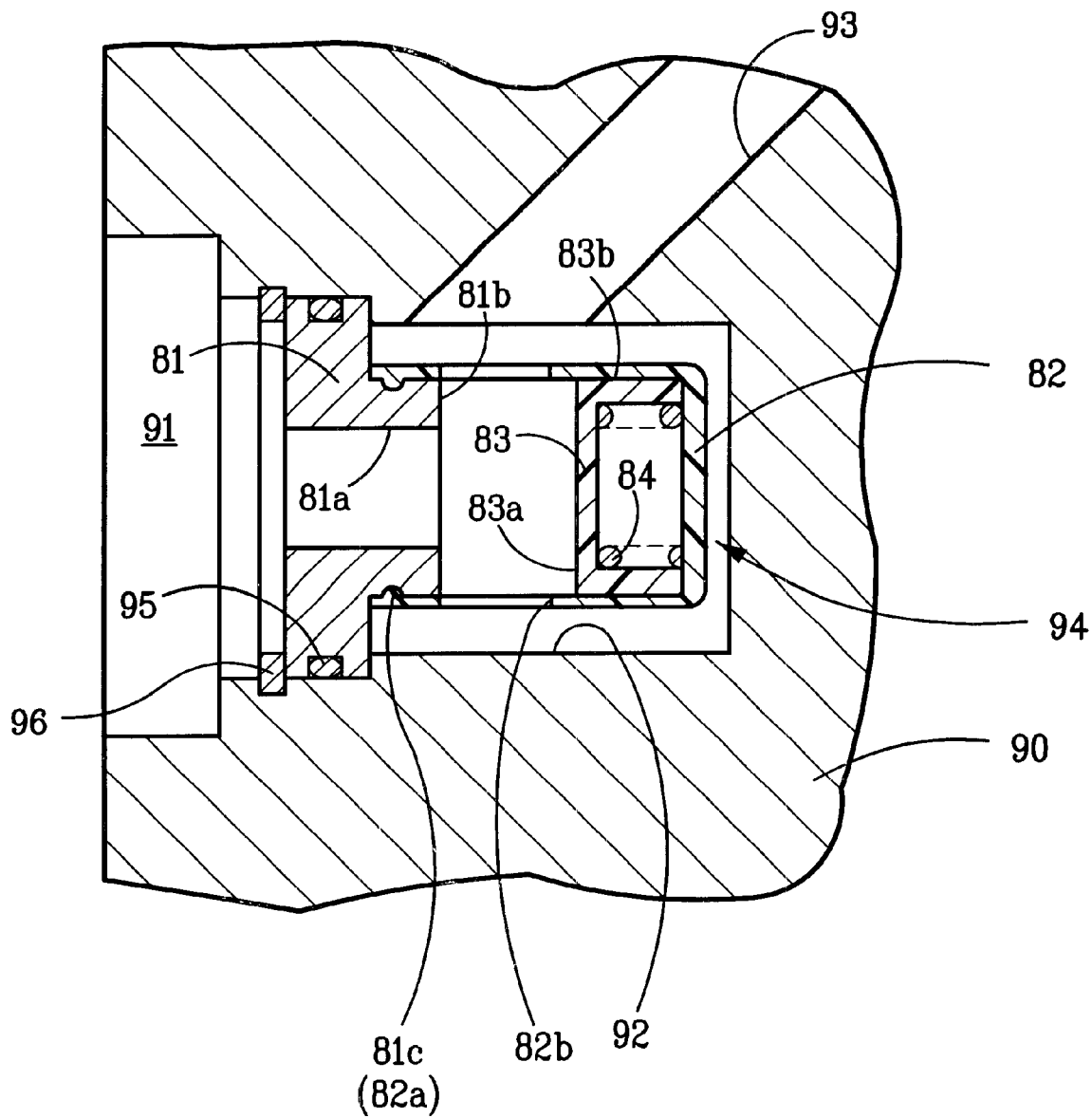
FIG. 15 is an enlarged longitudinal sectional view of the prior art check valve when the valve is opened.

The inventors have conducted experiments regarding the relationship between the flow rate and the pressure difference, and have compared the check valve 33 of the present invention having the damping chamber 71j with the prior art check valve 94 as shown in FIGS. 14 and 15. FIG. 12 shows the obtained results, in which the solid curve A shows the present invention and the broken line B shows the prior art. In each of the check valves 94 and 33, the valve element 72 or 83 starts to open at the pressure difference S and a semi-broken line C is obtained based on a calculation formula. From FIG. 12, it is apparent that it is possible to reduce the pressure loss, to closer to the calculated line C, in the compressor according to the present invention, compared with the prior art compressor.

In addition, when refrigeration is not required while the engine EG is operating, the supply of the electric current from the drive circuit 61 to the solenoid 47 in the control valve 32 is interrupted by a command from the control computer 62. As a result, the valve element 55a is biased by the spring 56 so that the control valve 32 is opened to a maximum degree of opening and a high pressure coolant gas within the discharge chamber 7b is introduced into the crank chamber 8 via the air-intake passages 60 and 58. Thus, the pressure in the crank chamber 8 increases to change the tilting angle of the swash plate 16 to a minimum level, whereby the stroke of the piston 19 is reduced. As a result, the discharge rate from the cylinder bore 1a into the discharge chamber 7b is reduced, with the result that the check valve 33 interrupts the communication between the flow passage 70f and the communication hole 71b. In this way, when the refrigeration is not required, the discharge of coolant gas from the compressor is suppressed by the check valve 33, and the compressor is driven at a minimum capacity in the vicinity of zero capacity. A small amount of coolant gas is recirculated along a circuit including the cylinder bore 1a, the discharge chamber 7b, the control valve 32, the crank chamber 8, the suction chamber 7a, and the cylinder bore 1a.

On the other hand, when the engine EG is stopped, the drive shaft 12 is stopped and the control valve 32 becomes inoperative. As shown in FIG. 10, the high pressure coolant gas prevailing on side of the condenser CO pushes the valve element 72 of the check valve 33 through the communication hole 71b to cause the same to slide in one direction in cooperation with the bias of the spring 73. Accordingly, the seal surface 72a abuts against the valve seat 70g of the valve seat member 70 so that the flow passage 70f is disconnected from the communication hole 71b. Thus, the high pressure coolant gas prevailing on side of the condenser CO is prevented from reversely flowing into the discharge chamber 7b.

Since the compressor provided with such a check valve 33 is capable of preventing the coolant gas from reversely flowing when the compressor is stopped, the storage of the liquid coolant within the compressor is avoidable, which in turn prevents the excessive increase in the pressure or temperature in the compressor to improve the durability of the compressor.

When the engine EG is started again, the drive shaft 12 is driven and the control valve 32 is operated. As shown in FIG. 11, the check valve 33 discharges the high pressure coolant gas from the discharge chamber 7b into the condenser CO.

In this manner, when the engine is stopped, the coolant gas contained only in the discharge chamber 7b is supplied to the crank chamber 8 through the air-intake passages 60 and 58, the ports 41b and 41a and the axial bore 52, and the reversely flowing coolant gas is inhibited from reaching the crank chamber 8. Thereby, it is possible to suppress the pressure increase in the crank chamber 8 and upon re-starting the compressor, it is possible to rapidly increase the tilting angle of the swash plate 16, and to rapidly recover the condition of the compressor from the minimum capacity to the maximum capacity, to realize a prompt refrigerating effect.

According to the check valve 33 of the above embodiment, vibration hardly occurs after opening the valve and therefore the generation of noise, vibration or pressure loss in the compressor and the refrigerating circuit is avoidable to eliminate a drawback caused thereby.

The check valve according to the present invention should not be limited to the one illustrated above but it should be understood that many modifications can be made within the. scope and the spirit of the present invention.

What is claimed is:

1. A check valve comprising:

a valve housing comprising a valve seat member connected to a case having a peripheral wall;

a flow passage with an inlet opening and an outlet opening formed in said valve seat member;

a valve seat formed in said valve seat member around said outlet opening;

a communication hole formed through said peripheral wall of said case on a downstream side of said valve seat;

a valve element having an outer wall axially slidably arranged within said peripheral wall of said case, and a seal surface engagable with said seat;

an urging member for biasing said valve element toward said valve seat; and a damper chamber formed in an interior of said case between said valve element and a top wall of said case for damping vibration of said valve element;

wherein said communication hole communicates the interior of said case around said valve element and the outside of said communication hole;

wherein said valve element is opened and closed according to a pressure difference between a pressure in said low passage and a pressure on a downstream side of said communication hole.

2. A check valve according to claim 1, wherein said outer wall of said valve element has such a length as to cover said communication hole and extend beyond said communication hole when said seal surface is seated on said valve set.

3. A check valve according to claim 2, wherein said valve element is made of resin, and said valve housing has a hole formed through said case.

4. A check valve according to claim 3, wherein said top wall closes one end of said peripheral wall, said hole being provided through said top wall.

5. A check valve according to claim 4, further comprising a linear groove on an outer surface of said top wall, said hole formed through said valve housing being provided through a bottom wall of said linear groove.

6. A check valve according to claim 4, wherein the sum of a cross-sectional area of said hole and a cross-sectional area of a clearance between said valve element and said valve housing has smaller than about 5% of a cross-sectional area in an inner surface of said closed end of said valve housing.

7. A check valve according to claim 4, further comprising a boss extending inward from said a closed end of said case, wherein said urging member is arranged in said damper chamber between said valve element and an outer surface of said boss so as not to vibrate, and said hole is arranged outside said boss.

8. A check valve according to claim 1, wherein said valve seat member and said casing are foamed separately and coaxially coupled together to form said valve housing.

9. A check valve according to claim 1, wherein said case is generally cup shaped with an open end and a closed end, wherein said outlet opening of said flow passage is opened to an interior of said case through said open end.

10. A check valve according to claim 1, wherein said communication hole has linear sides that are not parallel to an axis of said case, wherein said communication hole defines an equilateral triangular shape that is symmetrical with respect to said axis of said case, with said triangle having an apex at an axial position corresponding to said valve seat and a bottom side opposite thereto.

11. A check valve according to claim 1, wherein said communication hole is shaped and oriented such that an opening area of said communication hole with respect to a lift area of said valve element from said valve seat is smaller than that of a communication hole in the case where said opening area of said communication hole is proportional to said lift area of said valve element.

12. A check valve according to claim 1, wherein said damper chamber is formed in said interior of said case behind said valve element for damping vibration of said valve element.

13. A refrigerating circuit comprising:
a condenser;
an evaporator;
a variable capacity type compressor having a discharge chamber in fluid communication with the condenser, and a suction chamber in fluid communication with the evaporator; and a check valve arranged between said discharge chamber of said compressor and said condenser, said check valve comprising:
a valve housing comprising a valve seat member connected to a case having a peripheral wall;
a flow passage with an inlet opening and an outlet opening formed in said valve seat member;
a valve seat formed in said valve seat member around said outlet opening;
a communication hole formed through said peripheral wall of said case on a downstream side of said valve seat and in communication with a discharge passage;
a valve element having an outer wall axially slidably arranged within said peripheral wall of said case, and a seat surface engagable with said valve seat;
an urging member for biasing said valve element toward said valve seat; and
a damper chamber formed in an interior of said case behind said valve element for damping vibration of said valve element; and
a second flow passage between said dampening chamber and said discharge passage outside of said case;
said valve element being opened and closed according to a pressure difference between a pressure in said flow passage and a pressure on a downstream side of said communication hole.

14. A variable capacity type compressor comprising:
a housing having a plurality of cylinder bores;
a section chamber;
a discharge chamber;
pistons movably arranged in said cylinder bores;
a drive shaft;
a swash plate mounted to said drive shaft so that said swash plate is rotatable with said drive shaft and tiltable with respect to said drive shaft;
shoes operatively coupling said swash plate to said pistons to cause a gas to be sucked from said suction chamber, compressed in said cylinder bores, and discharged into said discharge chamber; and
a check valve arranged in said housing of said compressor, said check valve comprising:
a valve housing comprising a valve seat member connected to a case having a peripheral wall;
a first flow passage with an inlet opening and an outlet opening formed in said valve seat member;
a valve seat formed in said valve seat member around said outlet opening;
a communication hole formed through said peripheral wall of said case on a downstream side of said valve seat in communication with a discharge passage outside said case;
a valve element having an outer wall axially slidably arranged within said peripheral wall of said case, and a seal surface engagable with said valve seat, wherein said valve element is opened and closed according to a pressure difference between a pressure in said flow passage and a pressure outside said commutation hole;
an urging member for biasing said valve element toward said valve seat; and
a damper chamber formed in an interior of said case behind said valve element for damping vibration of said valve element; and
a second flow passage connecting said dampening chamber with said discharge passage.

15. A compressor according to claim 14, wherein said housing of said compressor has an accommodating chamber for accommodating said check valve.

16. A compressor according to claim 15, wherein said accommodating chamber comprises a first inner wall portion and a second inner wall portion contiguous to said first inner wall portion, said check valve being secured by said first inner wall portion and extending into said second inner wall portion with a gap therebetween, said second inner wall portion having an outer discharge passage in fluid communication with said communication hole.

17. A compressor according to claim 16, wherein said valve housing comprises said valve seat member having said flow passage and said valve seat, and said case coaxially coupled to said valve seat member and having said communication hole, said valve element and said urging member being arranged in said case.

18. A compressor according to claim 17, wherein said valve seat member is press-fit in said first inner wall portion.

19. A compressor according to claim 14, wherein said drive shaft is operatively coupled to an external drive source in a clutchless manner.

20. A compressor according to claim 14, further comprising a crank chamber arranged in said housing of said compressor in which said swash plate is arranged, an introduction passage extending between said discharge chamber and said crank chamber, a bleed passage extending between said crank chamber and said suction chamber, and a control valve arranged in one of said introduction passage and said bleed passage to control the tilting angle of said swash plate to thereby control the capacity of said compressor.

21. A compressor according to claim 20, wherein said compressor realizes a capacity of substantially 0%.

* * * * *